3,442,966
TRANSALKYLATION PROCESS
Ernest L. Pollitzer, Hinsdale, Ill., assignor to Universal Oil Products Company, Des Plaines, Ill., a corporation of Delaware
No Drawing. Filed Dec. 22, 1967, Ser. No. 692,646
Int. Cl. C07c 3/52, 3/58, 3/62
U.S. Cl. 260—672                                  6 Claims

ABSTRACT OF THE DISCLOSURE

Toluene is transalkylated utilizing a catalyst comprising a crystalline aluminosilicate suspended in an alumina matrix and having at least one active catalytic ingredient carried by the matrix.

Description of the invention

This invention relates to a conversion process for the transalkylation of toluene into more useful compounds. More specifically, this invention is concerned with a conversion process for the transalkylation of toluene utilizing a novel catalyst comprising a finely divided crystalline aluminosilicate suspended in an alumina matrix and having at least one active catalytic ingredient carried by the matrix.

It is therefore an object of this invention to provide a process for the transalkylation of toluene utilizing a novel transalkylation catalyst.

A specific object of this invention is to provide a novel method and novel catalysts for transalkylating toluene to provide the desired benzene and xylenes in high yields.

One embodiment of this invention relates to a transalkylation process which comprises contacting toluene at transalkylation conditions including a temperature in the range of from 400° C. to about 520° C., a pressure in the range of from about atmospheric to about 100 atmospheres, and a hydrogen to hydrocarbon mole ratio of from about 2:1 to about 20:1 with a catalyst comprising a finely divided crystalline aluminosilicate suspended in an alumina matrix and having at least one active catalytic ingredient carried by the matrix.

Other objects and embodiments referring to alternative catalytic compositions of matter will be found in the following further detailed description of the invention.

I have now discovered that toluene may be converted to benzene and to xylenes by contacting said toluene with certain catalytic compositions of matter which are prepared by specific methods. The novel catalyst employed in my invention consists essentially of a support comprising a finely divided crystalline aluminosilicate suspended in an alumina matrix and at least one catalytic ingredient composited on said support. The crystalline aluminosilicates are composed of $SiO_4$ and $AlO_4$ tetrahedra, a silicon or aluminum atom being centered around 4 oxygen atoms in the tetrahedra and the oxygens being shared with other surrounding tetrahedra. These aluminosilicates are geometrically arranged to form a pore structure having sufficiently large pore mouths to permit the reactant molecule to pass into said pore structure. Preferably, the aluminosilicates employed in the catalyst support have pore mouths of from about 5 up to about 15 A. in cross sectional diameter. The aluminosilicates are treated to improve their catalytic activity by techniques such as ion-exchange with suitable cations and thermal treatment and by treatment with acids such as hydrofluoric acid. Ordinarily, the aluminosilicates are synthetically prepared in the alkali metal form (usually sodium) and there is one monovalent alkali metal cation associated with these aluminum centered tetrahedra (to maintain electrical neutrality). The aluminosilicates may be ion exchanged with polyvalent cations such as calcium, magnesium, beryllium, and the rare earths, etc. to replace a substantial amount of the monovalent cation. This causes one polyvalent cation to be associated with more than one aluminum centered tetrahedra and if these tetrahedra are spread sufficiently far apart (due to the presence of silicon centered tetrahedra) areas of local electrical charge will be formed which aid in promoting catalytic reactions. Another treating technique to improve the catalytic activity of the aluminosilicates is to ion-exchange with ammonium ions followed by thermal treatment, preferably above 300° C. to convert the crystalline aluminosilicates to the hydrogen form.

There are numerous types of crystalline aluminosilicates, both synthetic and natural occurring, it is preferable that the pore mouths of the crystalline aluminosilicates have a cross sectional diameter of from about 5 to about 15 A. units. Among the preferable crystalline aluminosilicates that are suitable are the hydrogen and/or polyvalent forms of faujasite and mordenite.

The concentration of crystalline aluminosilicate in the alumina matrix is preferably less than about 20 wt. percent of the alumina although in some cases greater concentrations may also be suitable. Concentrations of aluminosilicates of about 10 wt. percent or less are especially preferred. The concentration of Group VIII metal depends to a large extent on the metal. When employing noble metals such as platinum or palladium, the concentration on the catalyst is preferably from about 0.05 to about 5.0 wt. percent.

Rare earth metals utilizable within the scope of this invention include cerium, lanthanum, praseodymium, neodymium, illinium, samarium, europium, gadolinium, terbium, dysprosium, holmium, erbium, thulium, scandium, yttrium, and lutecium, and mixtures thereof. A wide variety of rare earth compounds can be employed as a source of rare earth metal ions. Suitable compounds include rare earth chlorides, bromides, iodides, sulfates, acetates, benzoates, citrates, nitrates, and the like. The preferred rare earth salts are the chlorides, nitrates, and sulfates. The rare earth metal salts employed can either be the salt of a single rare earth metal or, as is usually the case, mixtures of rare earth metals such as rare earth metal chlorides. Thus, the catalyst may comprise rare earth cations chemisorbed or ionically bonded to the crystalline aluminosilicate, although at least a portion of said cations may be sorbed or bonded to the amorphous component of the catalyst composite. It is also contemplated within the scope of this invention that platinum and/or palladium may also be utilized in conjunction with rare earth metals in the process of this invention.

The process of this invention utilizing the catalyst hereinbefore set forth may be effected in any suitable manner and may comprise either a batch or a continuous type of operation. The preferred method by which the process of this invention may be effected in a continuous type operation. One particular method is the fixed bed operation in which the toluene is continuously charged to a reaction zone containing a fixed bed of the desired catalyst, said zone being maintained at the proper operating conditions of temperature and pressure, that is, a temperature in the range of from about 400° C. to about 520° C. or more, and preferably from about 425° C. to about 515° C., a pressure of from about atmospheric to about 100 atmospheres or more, and a hydrogen to hydrocarbon mol ratio of from about 2:1 to about 20:1. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to 1500 or more. The reaction zone may comprise an unpacked vessel or coil or may be lined with an adsorbent packing material. The charge passes through the catalyst bed in either an upward or downward or radial flow and the transalkylation product is continuously withdrawn, separated from the reactor effluent and recovered, while any unreacted starting material may be recycled to form a portion of the feed stock.

It is also contemplated within the scope of this invention that certain feed additives in an amount of from about 0.001 wt. percent to about 2.0 wt. percent of the toluene feed may be added to the transalkylation zone by, for example, commingling said feed additive with the hydrocarbon charge stock passing thereto or, by adding the feed additive simultaneously with, but independently of said hydrocarbon charge. However, the particular catalyst utilized as well as the particular transalkylation conditions will dictate whether a feed additive is desired and the amount that is necessary for efficient operation of my transalkylation process. Feed additives that are utilizable in my process are those providing chloride and/or sulfur, and/or water.

Another continuous type operation comprises the moving bed type in which the toluene and the catalyst bed move either concurrently or countercurrently to each other while passing through said reaction zone. Another type operation which may be used is the batch type operation in which a quantity of the toluene and the catalyst are placed in an appropriate apparatus, such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are given to illustrate the process of the present invention and are introduced for the purpose of illustration only with no intention of unduly limiting the generally broad scope of my invention.

Example I

A catalyst comprising 5% hydrogen form mordenite and 0.75 wt. percent palladium that was treated with hydrofluoric acid was placed in a transalkylation reaction zone. Toluene along with 600 p.p.m. sulfur and 50 p.p.m. chloride was continuously charged to said reaction zone at conditions including a temperature of 480° C., a pressure of 300 p.s.i.g., a hydrogen to hydrocarbon mol ratio of 8:1, and a LHSV of 1.0. The percent toluene converted to benzene was 37.7%. The percent toluene converted to $C_8$ aromatics was 48.2%. The percent toluene converted to $C_9$ aromatics and nonamormatics plus $C_{10}$'s was 4.6% and 9.5%, respectively.

It is noted that the $C_8$ composition of the product, in mol percent, was 0.7% ethylbenzene, 24.8% para-xylene, 51.1% meta-xylene, and 23.4% ortho-xylene.

A second run was made with the same catalyst at a temperature of 500° C., a pressure of 500 p.s.i.g., a hydrogen to hydrocarbon mol ratio of 8:1, and a LHSV of 1.0. The percent toluene converted to benzene increased to 39.1%. The percent toluene converted to $C_8$ aromatics decreased slightly to 46.7%. The percent toluene converted to $C_9$ aromatics and nonaromatics plus $C_{10}$'s was 4.1% and 10.1%, respectively. The $C_8$ composition of the product, in mol percent, was ethylbenzene, 0.7%; para-xylene, 24.5%; meta-xylene, 51.7%; and ortho-xylene, 23.1%.

Example II

A catalyst comprising a rare earth-platinum containing high silica faujasite, specifically a catalyst comprising 9 weight percent ion-exchanged rare earths (specifically, 2.5 wt. percent lanthanum, 4.4 wt. percent cerium, 0.6 wt. percent praseodymium, 1.4 wt. percent neodymium and trace amounts of samarium, europium and gadolinium) and 0.49 wt percent platinum, was placed in a transalkylation reaction zone. Toluene along with 600 p.p.m. sulfur and 2000 p.p.m. water was continuously charged to said reaction zone at conditions including a temperature of 480° C., 300 p.s.i.g., a hydrogen to hydrocarbon mole ratio of 8:1, and a LHSV of 1.0. The percent toluene converted to benzene was 42.6%. The percent toluene converted to $C_8$ aromatics was 35.2%. The percent toluene converted to $C_9$ aromatics and nonaromatics plus $C_{10}$'s was 4.1% and 18.1%, respectively.

It is noted that the $C_8$ composition of the product, in mol percent, was ethylbenzene, 1.4%; para-xylene, 24.6%; meta-xylene, 50.7%; and ortho-xylene, 23.3%.

A second run was made with the same catalyst at a temperature of 500° C., a pressure of 300 p.s.i.g., a hydrogen to hydrocarbon mol of 8:1, and a LHSV of 0.75. The percent toluene converted to benzene decreased slightly to 41.3%. The percent toluene converted to $C_8$ aromatics decreased slightly to 32.9%. The percent toluene converted to $C_9$ aromatics and nonaromatics plus $C_{10}$'s was 3.2% and 22.6%, respectively.

The $C_8$ composition of the product, in mol percent, was ethylbenzene, 0.8%; para-xylene, 24.8%; meta-xylene, 51.1%; and ortho-xylene, 23.3%.

Example III

A catalyst comprising magnesium cation exchanged high silica faujasite and 0.71 wt. percent platinum was placed in a transalkylation reaction zone. Toluene along with 600 p.p.m. sulfur and 2000 p.p.m. water was continuously charged to said reaction zone at conditions including a temperature of 480° C., a pressure of 300 p.s.i.g., a hydrogen to hydrocarbon mol ratio of 8:1, and a LHSV of 2.0. The percent toluene converted to benzene was 36.9%. The percent toluene converted to $C_8$ aromatics was 40.3%. The percent toluene converted to $C_9$ aromatics and nonaromatics plus $C_{10}$'s was 3.9% and 18.9%, respectively.

The $C_8$ composition of the product, in mol percent, was ethylbenzene, 0.9%; para-xylene, 24.6%; meta-xylene, 51.7%; and ortho-xylene, 22.8%.

A second run was made with the same catalyst at a temperature of 500° C., a pressure of 500 p.s.i.g., a hydrogen to hydrocarbon mol ratio of 8:1, and a LHSV of 1.0. The percent toluene converted to benzene decreased slightly to 34.8%. The percent toluene converted to $C_8$ aromatics decreased considerably to 22.0%. The percent toluene converted to $C_9$ aromatics and nonaromatics plus $C_{10}$'s aromatics was 1.7% and 41.5%, respectively. The $C_8$ composition of the product, in mol percent, was ethylbenzene, 2.4%; para-xylene, 22.8%; meta-xylene, 51.2%; and ortho-xylene, 23.6%.

Example IV

A catalyst comprising 5% hydrogen form mordenite and 0.75 wt. percent platinum that was treated with hydrogen fluoride was placed in a transalkylation zone. Toluene, along with 600 p.p.m. sulfur and 50 p.p.m. chloride was continuously charged to said reaction zone at conditions including a temperature of 500° C., a pressure of 305 p.s.i.g., a hydrogen to hydrocarbon mol ratio of 8:1, and a LHSV of 1.0. The percent toluene converted to benzene was 31.0%. The percent toluene converted to $C_8$ aromatics was 30.0%. The percent toluene converted to $C_9$ aromatics and nonaromatics plus $C_{10}$'s was 3.2% and 35.8%, respectively.

The $C_8$ composition of the product, in mol percent, was ethylbenzene, 4.2%; para-xylene, 23.2%; meta-xylene, 49.5%; and ortho-xylene, 23.1%.

A second run was made with the same catalyst at a temperature of 480° C., a pressure of 300 p.s.i.g., a hydrogen to hydrocarbon mol ratio of 8:1, and a LHSV of 0.3. The percent toluene converted to benzene decreased to 16.8%. The percent toluene converted to $C_8$ aromatics was 23.8%. The percent toluene converted to $C_9$ aromatics and nonaromatics plus $C_{10}$'s was 2.9% and 57.0%, respectively.

The $C_8$ composition of the product, in mole percent, was ethylbenzene, 3.8%; para-xylene, 24.0%; meta-xylene, 50.1%; and ortho-xylene, 22.1%.

I claim as my invention:

1. A transalkylation process which comprises contacting toluene at transalkylation conditions including a temperature in the range of from about 400° C. to about 520° C., a pressure in the range of from about atmospheric to about 100 atmospheres, and a hydrogen to hydrocarbon mol ratio of from about 2:1 to about 20:1 with a catalyst comprising a finely divided crystalline aluminosilicate suspended in an alumina matrix and having at least one active catalytic ingredient selected from the group consisting of a metal selected from Group VIII of the Periodic Table and the rare earth metals, said contact additionally being made in the presence of an additive selected from the group consisting of sulfur, chlorine and water.

2. The process of claim 1 further characterized in that the crystalline aluminosilicate is in the hydrogen form and the active catalytic ingredient comprises a metal selected from Group VIII of the Periodic Table.

3. The process of claim 1 further characterized in that the crystalline aluminosilicate is in the hydrogen form and the active catalytic ingredient comprises at least one metal selected from the group consisting of platinum, palladium, and the rare earth metals.

4. The process of claim 1 further characterized in that the crystalline aluminosilicate is a mordenite type and the active catalytic ingredient comprises at least one metal selected from the group consisting of platinum, palladium, and the rare earth metals.

5. The process of claim 1 further characterized in that the crystalline aluminosilicate is a faujasite type and the active catalytic ingredient comprises at least one metal selected from the group consisting of platinum, palladium and the rare earth metals.

6. The process of claim 1 further characterized in that the crystalline aluminosilicate is faujasite containing a magnesium cation composited with at least one metal selected from the group consisting of platinum, palladium, and the rare earth metals.

References Cited

UNITED STATES PATENTS

| 3,140,253 | 7/1964 | Plank et al. | 208—120 |
| 3,281,483 | 10/1966 | Benesi et al | 260—672 |

FOREIGN PATENTS

| 1,081,373 | 8/1967 | Great Britain. |

DELBERT E. GANTZ, *Primary Examiner.*

G. E. SCHMITKONS, *Assistant Examiner.*

U.S. Cl. X.R.

252—455